(No Model.) 2 Sheets—Sheet 1.

H. SCHUMM.
DRIVING GEAR FOR MOTOR CARS.

No. 572,453. Patented Dec. 1, 1896.

Witnesses
Thos. A. Bunn
Robert Everett

Inventor
Hermann Schumm.
By James L. Norris,
Atty (No Model.) 2 Sheets—Sheet 2.
H. SCHUMM.
DRIVING GEAR FOR MOTOR CARS.
No. 572,453. Patented Dec. 1, 1896.
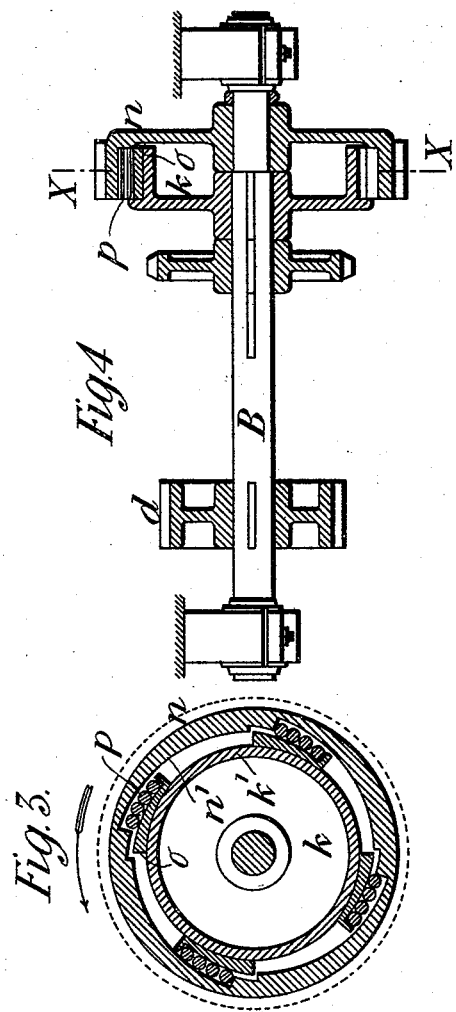
Witnesses.
Thos. A. Brown
Robert Everett
Inventor.
Hermann Schumm.
By
James L. Norris,
Atty.

UNITED STATES PATENT OFFICE.

HERMANN SCHUMM, OF COLOGNE, GERMANY, ASSIGNOR TO THE GAS-MOTOREN-FABRIK-DEUTZ, OF COLOGNE-DEUTZ, GERMANY.

DRIVING-GEAR FOR MOTOR-CARS.

SPECIFICATION forming part of Letters Patent No. 572,453, dated December 1, 1896.

Application filed June 30, 1896. Serial No. 597,630. (No model.)

*To all whom it may concern:*

Be it known that I, HERMANN SCHUMM, a citizen of Switzerland, residing at Cologne, in the Empire of Germany, have invented certain new and useful Improvements in Driving-Gear for Motor-Cars, of which the following is a specification.

This invention relates to motor-cars that are driven by a motor running with constant speed, which motor is connected with the road-wheels of the vehicle by toothed gearing, so arranged as to enable the latter to be driven either at a fast or at a slow speed.

The present improvement relates to the combination, with such variable-speed gear, of automatically-acting mechanism whereby when the gear is changed to the fast speed the gear for the slow speed is prevented from being carried around thereby, thus preventing noise and preserving the gear from useless wear.

Figure 1:
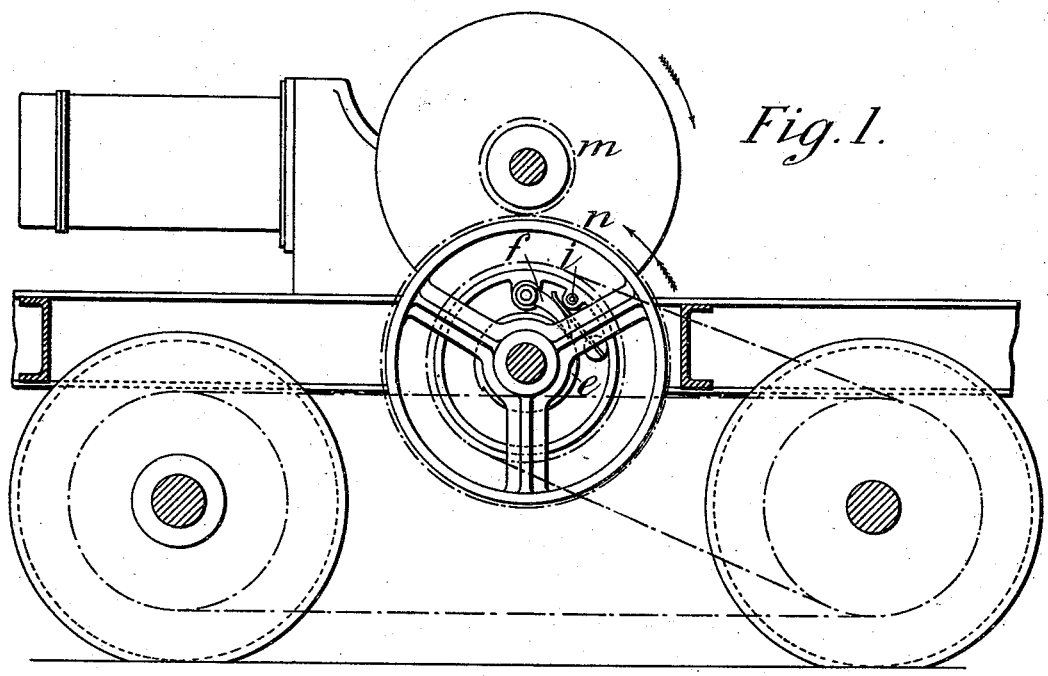
Figure 2:
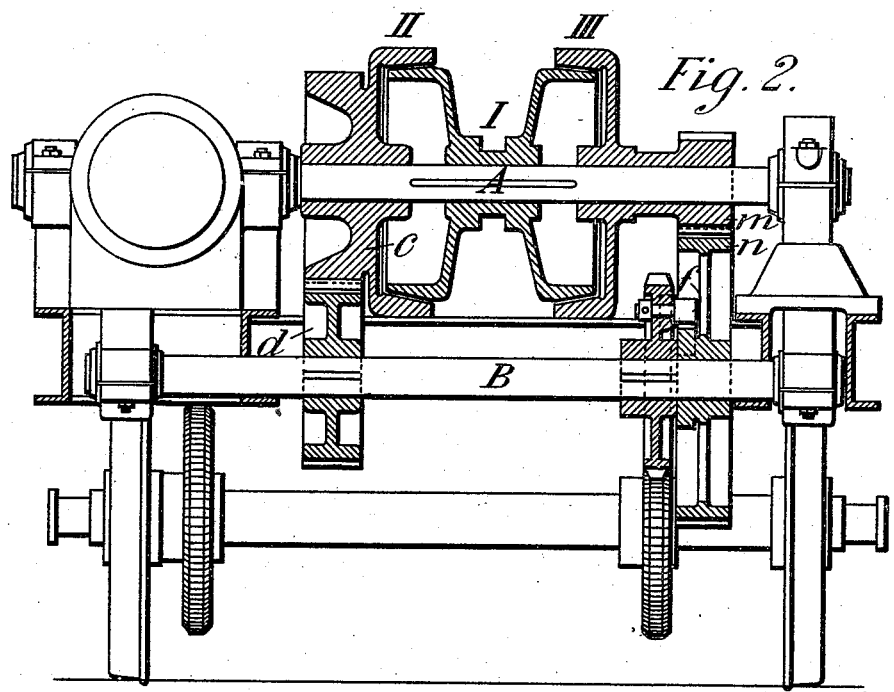

One arrangement of the said mechanism is shown at Figures 1 and 2 on the accompanying drawings, in which Fig. 1 shows a side view, and Fig. 2 a cross-section thereof. Figs. 3 and 4 show, respectively, a longitudinal section and a cross-section at $x\,x$ of a modified construction.

Referring to Figs. 1 and 2, the main driving-shaft A is driven either directly or indirectly at a constant speed in one and the same direction by a motor-engine C of any suitable kind. It carries two loose spur-wheels $c$ and $m$, which gear, respectively, with the spur-wheels $d$ and $n$ on the intermediate shaft B. If the one wheel $c$ be coupled with the main shaft by the engagement of the clutch parts I and I I, the shaft B will be rotated through wheel $d$ at a quick speed. If, on the other hand, the other wheel $m$ be coupled with the shaft A by the engagement of the clutch parts I and I I I, the shaft B will be driven at a slow speed through the wheels $m\,n$. The motion of the shaft B is transmitted either directly, as shown, or through another intermediate shaft to the road-wheels of the vehicle. In the construction of such variable-speed gear heretofore employed the wheels $d$ and $n$ were both fixed on the intermediate shaft. In consequence whereof, when the one pair of wheels were coupled with the motor-shaft the idle pair were obliged to run too. This causes, in particular with the quick speed, that is, when the motion is transmitted through $c$ and $d$, a detrimental noise and useless wear, inasmuch as the shaft B, which is running at a considerable speed, will impart a very high speed to the pinion $m$ through the wheel $n$, owing to the high ratio of transmission, and at this high speed there will be a considerable impact between the teeth of the gear, owing to the unavoidable inequalities in the motion of the motor. The present improvement consists in avoiding this disadvantage by fitting the slow-speed wheel $n$ loose on the intermediate shaft B and fixing or forming thereon a ratchet-wheel $e$, with which gears a spring-pawl $f$, fixed on the shaft B. Thus when the vehicle is driven at the slow speed through the gear $m$ and $n$ the wheel $w$ will carry around shaft B by means of the ratchet-and-pawl connection $e\,f$. When, on the other hand, the vehicle is driven at the quick speed through the gear $c\,d$, the gear $m\,n$ will remain at rest, as the pawl $f$ will then travel around the ratchet-wheel $e$ without carrying it around. In order to prevent any noise from the impact of the pawl with the ratchet-teeth during this motion, the pawl $f$ is made sufficiently massive to be caused to fly off from the ratchet-teeth by the centrifugal action produced by the quick rotation of shaft B. A stop $i$ may be provided for limiting this action.

Figs. 3 and 4 show, respectively, a longitudinal section and a cross-section on line X X of a modification in which a frictional ratchet device of known construction is employed in place of the pawl-and-ratchet device of the first arrangement. In this case the wheel $n$ for the slow speed, which is loose on shaft B, as before, is formed hollow with cam-surfaces $n'$ on the inner periphery, and on the shaft B is fixed a disk $k$ with cylindrical rim $k'$, which projects into the hollow wheel $n$ and carries a series of loose wedges $o$, having, by preference, a leather surface fitting on the disk, between which wedges $o$ and the cam-surfaces $n'$ of $n$ are placed rollers $p$. Thus on the wheel $n$ being driven in the direction of the arrow for the slow speed, as before, the cam-surfaces $n'$ thereof will cause the rollers to join the wedges $o$ tight onto the rim $k'$, and the disk $k$ will consequently be carried around. On the other hand, when the shaft B is being driven at the quick speed by the gear $c\ d$, the wedges $o$, in being carried forward relatively to the cam-surfaces of wheel $n$ by the disk $k$ into the position shown at Fig. 3, the rollers $p$ will be free of the cam-surfaces and will release the wedges, and the disk $k$ will revolve without carrying around the wheel $n$.

Having thus described the nature of my invention and the best means I know for carrying the same into practical effect, I claim—

In variable-speed gear for motor-cars wherein the motor-shaft A running at a constant speed, imparts a fast or slow motion to an intermediate shaft by means of fast-speed gear $c\ d$, and slow-speed gear $m\ n$, the combination with the intermediate shaft B of a slow-speed toothed wheel $n$ mounted loose thereon and carrying a ratchet-wheel $e$ gearing with a pawl $f$ carried by the shaft B, which ratchet-gear transmits the motion to the shaft B when the wheel $n$ is being driven by shaft A and wheel $m$ but when the shaft B is driven through the fast-speed gear, the pawl $f$ will be automatically disengaged from the ratchet-wheel $e$ by centrifugal action, and will thus prevent the motion of shaft B from being imparted to the slow-speed gear, substantially as described.

In testimony whereof I have signed my name to this specification, in the presence of two subscribing witnesses, this 9th day of June, A. D. 1896.

HERMANN SCHUMM.

Witnesses:
SOPHIE NAGEL,
WILLIAM A. MADDEN.